(12) United States Patent
Koc et al.

(10) Patent No.: US 9,439,208 B2
(45) Date of Patent: Sep. 6, 2016

(54) SCHEDULING REQUESTS FOR WIRELESS COMMUNICATION DEVICES RUNNING BACKGROUND APPLICATIONS

(75) Inventors: Ali Koc, Hillsboro, OR (US); Maruti Gupta, Portland, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 935 days.

(21) Appl. No.: 13/568,508

(22) Filed: Aug. 7, 2012

(65) Prior Publication Data

US 2013/0115990 A1    May 9, 2013

Related U.S. Application Data

(60) Provisional application No. 61/556,109, filed on Nov. 4, 2011.

(51) Int. Cl.
*H04B 7/00* (2006.01)
*H04W 72/12* (2009.01)
*G06F 9/48* (2006.01)
(Continued)

(52) U.S. Cl.
CPC .......... *H04W 72/1278* (2013.01); *G06F 9/485* (2013.01); *H04L 5/0053* (2013.01); *H04L 5/0076* (2013.01); *H04L 5/0091* (2013.01); *H04W 4/12* (2013.01); *H04W 88/02* (2013.01)

(58) Field of Classification Search
CPC ................................................. H04W 72/1278
USPC ..................... 455/450, 452.1, 509
See application file for complete search history.

(56) References Cited

U.S. PATENT DOCUMENTS

2010/0046451 A1* 2/2010 Tada et al. ..................... 370/329
2011/0188422 A1* 8/2011 Ostergaard et al. .......... 370/311
(Continued)

FOREIGN PATENT DOCUMENTS

EP           1643690 A1   4/2006
KR   10-2011-0061507 A   6/2011
(Continued)

OTHER PUBLICATIONS

International Preliminary Report on Patentability mailed May 15, 2014 for International Application No. PCT/US2012/062869, 6 pages.

(Continued)

*Primary Examiner* — Tilahun B Gesesse
(74) *Attorney, Agent, or Firm* — Schwabe, Williamson & Wyatt, P.C.

(57) ABSTRACT

In embodiments, a user equipment (UE) may transmit, to an evolved Node B (eNB), a background indicator that the UE is in a background mode running one or more background applications and no active applications. The eNB may receive background indicators from a plurality of UEs, and may bundle the background-mode UEs into one scheduling request (SR) allocation block. The individual UEs may be assigned different resource elements within the block on which to transmit an SR indicator (e.g., if the UE has data to send to the eNB). The eNB may lengthen the period between SR allocations for the background-mode UEs compared with active-mode UEs. In some embodiments, the UE may exclusively use the assigned SR allocation instead of a random access channel to notify the eNB that the UE has data to send.

26 Claims, 4 Drawing Sheets

(51) Int. Cl.
*H04L 5/00* (2006.01)
*H04W 4/12* (2009.01)
*H04W 88/02* (2009.01)

(56) References Cited

U.S. PATENT DOCUMENTS

| | | | |
|---|---|---|---|
| 2011/0228731 A1 | 9/2011 | Lou et al. | |
| 2012/0236834 A1* | 9/2012 | Ho | H04W 52/0216 370/337 |
| 2013/0081026 A1* | 3/2013 | Malkamaki | H04L 5/0053 718/102 |

FOREIGN PATENT DOCUMENTS

| KR | 10-2011-0082489 A | 7/2011 |
|---|---|---|
| KR | 10-2011-0112777 A | 10/2011 |

OTHER PUBLICATIONS

International Search Report and Written Opinion for International Application No. PCT/US2012/062869, mailed Jan. 25, 2013.

Extended European Search Report issued Jul. 3, 2015 from European Patent Application No. 13746057.2.

Texas Instruments, "Preamble-Based Scheduling Request: Comparison with Other Solutions," 3GPP TSG RAN WG1 #48, R1-070718, Agenda Item: 6.5.1, Feb. 12-16, 2007, St. Louis, USA, 8 pages.

Motorola, "Scheduling Request Mechanism for EUTRA Uplink," 3GPP TSG RAN 1#51, R1-074599, Nov. 5-9, 2007, Agenda Item: 6.2.4, Jeju, Korea, 2 pages.

Panasonic, "DRX and DTX Operation in LTE_Active," 3GPP TSG-RAN WG2 Meeting #52, R2-061061, Mar. 27-31, 2006, Agenda Item: 6.1, Athena, Greece, 3 pages.

Ericsson et al., "Latency improvement comparison," 3GPP TSG-RAN WG2 #67, R2-094825, Aug. 24-28, 2009, Agenda Item: 7.2, Shenzhen, China, 4 pages.

Intel, "Frequent idle-active state transitions caused by mobile data applications," 3GPP TSG-SA1 #53, S1-110120, Feb. 14-18, 2011, Agenda Item: 8.6 FS_MODAI, Nashville, TN, USA, 6 pages.

* cited by examiner

SCHEDULING REQUESTS FOR WIRELESS COMMUNICATION DEVICES RUNNING BACKGROUND APPLICATIONS

CROSS REFERENCE TO RELATED APPLICATIONS

The present application claims priority to U.S. Provisional Patent Application No. 61/556,109, filed Nov. 4, 2011, entitled "ADVANCED WIRELESS COMMUNICATION SYSTEMS AND TECHNIQUES," the entire disclosure of which is hereby incorporated by reference.

FIELD

Embodiments of the present invention relate generally to the field of communications, and more particularly, to scheduling requests for wireless communication devices running background applications.

BACKGROUND

In many wireless communication networks, user equipments (UEs) may run background applications which require sending data to an evolved Node B (eNB) in small amounts and/or infrequently. In some networks, such as long-term evolution (LTE) networks, there are two mechanisms for the UE to request an allocation of uplink channel resources on which to send data to the eNB. One is for the UE to send a message to the eNB on a random access channel, and the other is for the UE to send a scheduling request (SR) to the eNB in a resource element of a physical uplink control channel (PUCCH) assigned to the UE as part of an SR allocation. It may be desirable to keep UEs running background applications in a radio resource control (RRC) connected state in order to avoid signaling overhead of frequent connection and disconnection with the network to send data for the background applications. Accordingly, an SR allocation must be assigned to the UE. However, for UEs running background applications, only a small number of the SR allocation slots are used by the UE.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Illustrative embodiments of the present disclosure include, but are not limited to, methods, systems, and apparatuses for configuring scheduling requests for wireless communication devices running background applications.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
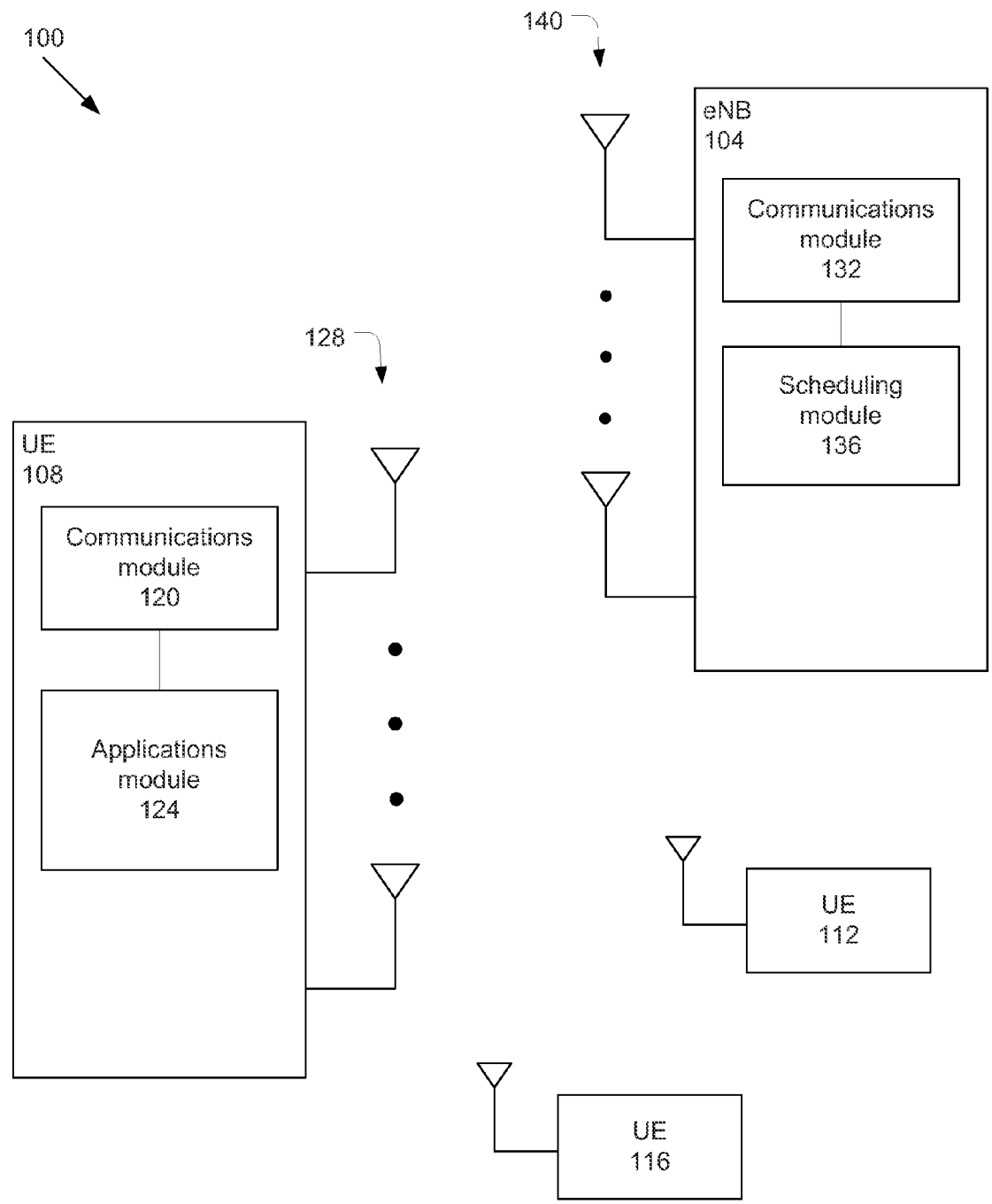
FIG. 1 is a block diagram illustrating wireless communication network in accordance with various embodiments.

FIG. 1 schematically illustrates a wireless communication network 100 in accordance with various embodiments. Wireless communication network 100 (hereinafter "network 100") may be an access network of a 3rd Generation Partnership Project (3GPP) long-term evolution (LTE) network such as evolved universal mobile telecommunication system (UMTS) terrestrial radio access network (E-UTRAN). The network 100 may include a base station, e.g., evolved Node B (eNB) 104, configured to wirelessly communicate with user equipment (UE) 108. The network 100 may further include one or more additional UEs, e.g., UEs 112 and 116, that wirelessly communicate with eNB 104.

The UE 108 may include a communications module 120 and an applications module 124 coupled with one another. The communications module 120 may communicate (e.g., transmit and/or receive) with the eNB 104 over the network 100. The applications module 124 may run one or more applications on the UE 108. The applications may be stored on the UE 108 and/or accessed by the UE 108 from a remote storage. The communications module 120 may be further coupled with one or more of a plurality of antennas 128 of the UE 108 for communicating wirelessly over network 100.

The UE 108 may include any suitable number of antennas 128. In various embodiments, the UE 108 may include at least as many antennas 128 as a number of simultaneous spatial layers or streams received by the UE 108 from the eNBs, although the scope of the present disclosure may not be limited in this respect. The number of simultaneous spatial layers or streams may also be referred to as transmission rank, or simply rank.

One or more of the antennas 128 may be alternately used as transmit or receive antennas. Alternatively, or additionally, one or more of the antennas 128 may be dedicated receive antennas or dedicated transmit antennas.

Though not shown explicitly, the UEs 112 and 116 may include modules/components similar to those of the UE 104.

eNB 104 may include a communications module 132 and a scheduling module 136 coupled with one another. The communications module 132 may be further coupled with one or more antennas 140 of the eNB 104. The communications module 132 may communicate (e.g., transmit and/or receive) with one or more UEs (e.g., UEs 108, 112, and/or 116). In various embodiments, the eNB 104 may include at least as many antennas 140 as a number of simultaneous transmission streams transmitted to the UE 108, although the scope of the present disclosure may not be limited in this respect. One or more of the antennas 140 may be alternately used as transmit or receive antennas. Alternatively, or additionally, one or more of the antennas 140 may be dedicated receive antennas or dedicated transmit antennas.

In various embodiments, the UE 108 may switch between a background mode and an active mode. The background mode may be defined as a mode during which the UE, through the applications module 124, for example, is running one or more background applications and no active applications. Active applications refer to applications that are actively interacting with a user of the UE 108. Accordingly, the UE 108 may not be engaged in active interaction with the user during the background mode. A display (not shown) of the UE 108 may or may not be turned off during the background mode. In the active mode, the UE 108 may be running one or more active applications and/or may be actively interacting with the user. The UE 108 may be capable of being in one or more other modes instead of or in addition to the background mode and/or active mode. For example, in some circumstances, the UE 108 may not be running any background applications or active applications.

In various embodiments, the applications module 124 of UE 108 may transmit to the eNB 104 (e.g., via the communications module 120) a background indicator that indicates the UE 108 is in the background mode. In some embodiments, the background indicator may be included in a medium access control (MAC) message sent from the UE 108 to the eNB 104. In some embodiments, the UE 108 may send another indicator to the eNB 104 if the UE 108 exits the background mode (e.g., if the UE 108 transitions into the active mode or the UE 108 is no longer running any background applications). For example, the background indicator may include a bit having a first value if the UE 108 is in the background mode and a second value if the UE 108 is in the active mode. In other embodiments, the UE 108 may only send the background indicator when the UE 108 enters the background mode.

In various embodiments, the eNB 104 may receive background indicators from a plurality of UEs indicating that the UEs are in the background mode. These UEs may be referred to as background UEs. The background UEs may be in a radio resource control (RRC) connected state with the eNB 104. Accordingly, the eNB 104 may assign scheduling request (SR) allocations to the background UEs for the UE to use when sending an SR indicator (also referred to as simply an SR) to the eNB 104. For example, the UE 108 may send an SR to the eNB 104 to notify the eNB 104 that the UE 108 has data to send to the eNB 104 for one or more of the background applications.

In various embodiments, the eNB 104 may assign SR allocations to individual background UEs of the set of background UEs in a common resource block of a channel (e.g., a physical uplink control channel (PUCCH)). In some embodiments, the resource block may be designated for SRs from background UEs (e.g., the resource block may not be used for other data).

In various embodiments, the resource block may include a plurality of resource elements corresponding to a frequency and a time allocation within the resource block. The SR allocation may assign a specific resource element of the common resource block to respective background UEs for sending scheduling requests to the eNB 104. The SR allocation may further include an associated periodicity between successive assigned resource elements for the UE.

In some embodiments, each resource block may include a limited number of resource elements available for SRs, such as up to eighteen. In this case, the resource block may include SR allocations for up to eighteen background UEs. If there are more background UEs than the limit for one resource block, then additional designated resource blocks may be used for SR allocations of the background UEs.

In various embodiments, the eNB 104 may send a transmission to the UE 108 to notify the UE 108 of its assigned SR allocation. The SR allocation may identify the resource element and associated periodicity to be used for SRs by the UE 108. In some embodiments, the eNB 104 may notify the UE 108 of its assigned SR allocation via an RRC control message transmitted by the eNB 104.

In various embodiments, if the UE 108 has data to transmit to the eNB 104 for one or more of the background applications, the UE 108 may transmit an SR to the eNB 104 in the resource element of the assigned SR allocation. The UE 108 may be configured to exclusively use the assigned SR allocation to indicate to the eNB 104 that the UE 108 has data to send. For example, the UE 108 may not use a random access channel to notify the eNB 104 that the UE 108 has data to send. In some embodiments, the eNB 104 may instruct the UE 108 to use the assigned SR allocation instead of the random access channel when the UE 108 has data to send. Alternatively, or additionally, the UE 108 may be pre-configured to use the assigned SR allocation exclusively when the UE 108 is in the background mode.

In some embodiments, the periodicity of the assigned SR allocation for the background UEs may be longer than a periodicity for the active mode UEs communicating over network 100. The background indicator may allow the eNB 104 to identify which UEs are in the background mode, and to adjust (e.g., lengthen) the periodicity of the SR allocations for the background UEs accordingly. Additionally, having the SR allocations for the background UEs bundled into one or more common resource blocks may facilitate the eNB 104 setting a longer periodicity for the background UEs than for the active mode UEs.

Additionally, or alternatively, the bundling of the SR allocations for the background mode UEs into one or more common resource blocks may free up other resource blocks for other transmissions. In many networks, unused resource elements in a resource block that is used for one or more SR allocations may not be used for other data. Accordingly, the SR allocation scheme described herein may consolidate the SR allocations for the background UEs into a fewer number of resource blocks, thereby allowing other resource blocks of the channel to be used for other purposes. Some of the background UEs may experience a delay between available SR allocations due to the bundled SR allocations, however, this may be acceptable for background UEs running only background applications.

In various embodiments, when the UE 108 is no longer in the background mode (e.g., if the UE transitions to the active mode and/or stops running the one or more background applications), the UE 108 may send a message to the eNB 104 indicating that the UE 108 is no longer in the background mode.

Figure 2:
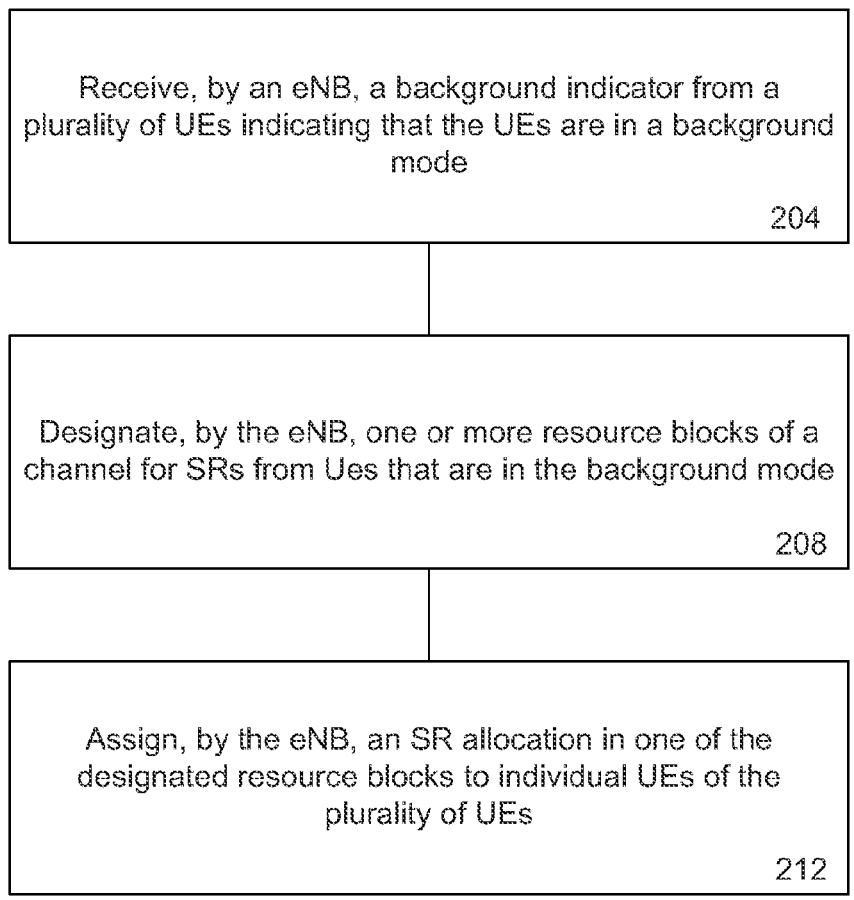
FIG. 2 is a flowchart illustrating a method of managing scheduling request allocations that may be performed by a base station in accordance with various embodiments.

FIG. 2 illustrates a method 200 of managing SR allocations for a plurality of UEs (e.g., UEs 108, 112, and/or 116). Method 200 may be performed by an eNB, such as eNB 104. In some embodiments, the eNB may include and/or have access to one or more computer-readable media having instructions stored thereon, that, when executed, cause the eNB to perform the method 200.

At 204, the eNB may receive a background indicator from a plurality of UEs indicating that the plurality of UEs are in a background mode running one or more background applications and no active applications. In some embodiments, the background indicator may be received via MAC signaling.

At 208, the eNB may designate one or more resource blocks of a channel (e.g., the PUCCH) for SRs from UEs that are in the background mode. In some embodiments, the designated resource blocks may be used exclusively for SRs from background UEs. In other embodiments, the designated resource blocks may also be used for SRs of other UEs (e.g., active mode UEs), for example if additional resource elements of the resource blocks are available.

At 212, the eNB may assign an SR allocation in one of the designated resource blocks to individual UEs of the plurality of UEs. The eNB may assign SR allocations to a number of UEs up to a limit, such as eighteen UEs, to a given resource block. The SR allocation may identify a resource element of the one or more designated resource blocks and a periodicity for individual UEs to use for sending SRs to the eNB. In some embodiments, the periodicity associated with the SR allocations for the background UEs may be longer than a periodicity for active mode UEs communicating with the eNB.

The eNB may transmit a message, such as an RRC control message, to the plurality of background UEs to notify the UEs of their assigned SR allocations. The eNB may thereafter receive SRs from one or more of the background UEs in the resource elements assigned to the respective background UEs. The SR may indicate that the UE has data to send to the eNB (e.g., for one or more of the background applications).

Figure 3:
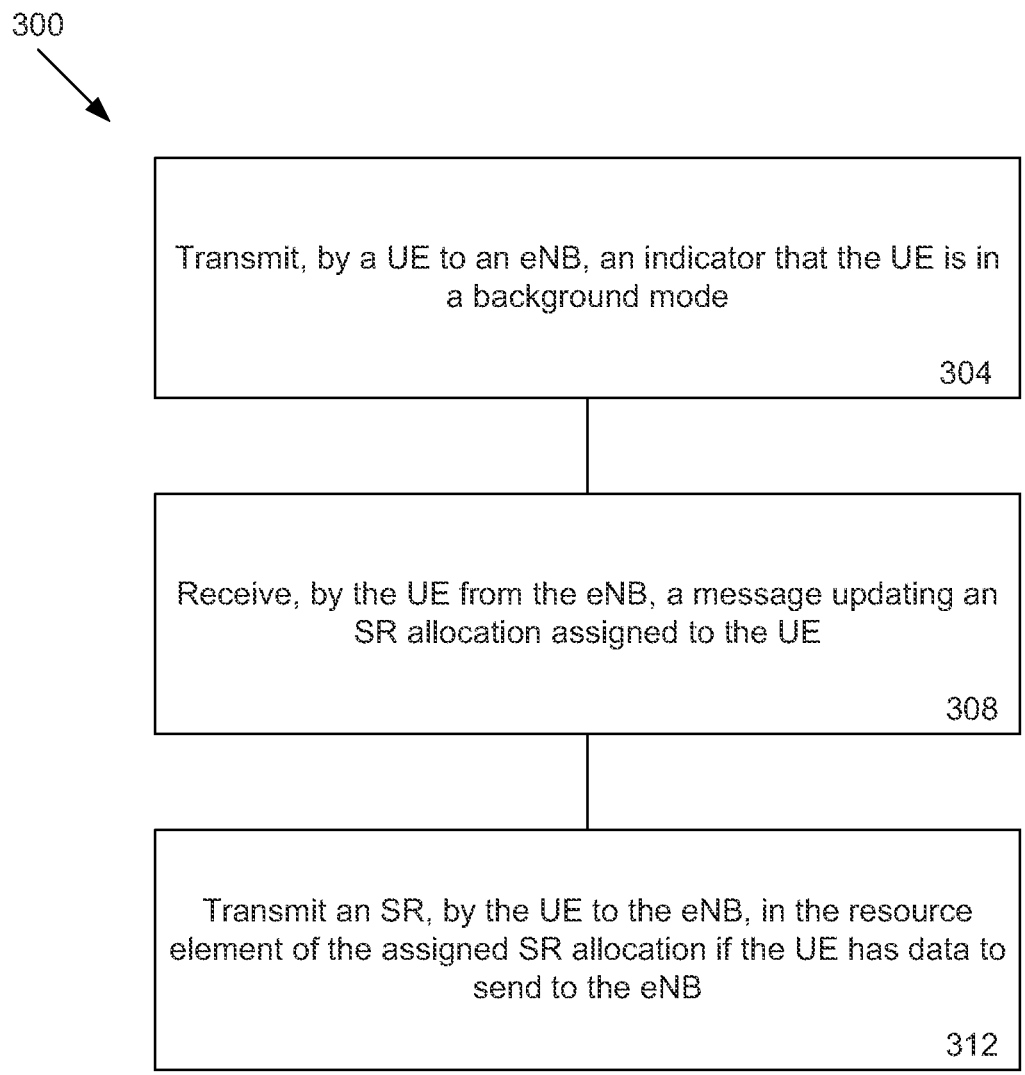
FIG. 3 is a flowchart illustrating a method that may be performed by a user equipment in accordance with various embodiments.

FIG. 3 illustrates a method 300 that may be performed by a UE (e.g., UE 108) in accordance with various embodiments. In some embodiments, the UE may include and/or have access to one or more computer-readable media having instructions stored thereon, that, when executed, cause the UE to perform the method 300.

At 304, the UE may transmit, to an eNB over a wireless communication network, an indicator that the UE is in a background mode. The indicator may be included in a MAC message transmitted by the UE to the eNB.

At 308, the UE may receive a message, such as an RRC message, updating an SR allocation assigned to the UE. The SR allocation may identify a resource element in which the UE is to send an SR to the eNB if the UE has data to send to the eNB. The resource element of the SR allocation may be included in a resource block of the PUCCH designated for SR allocations of UEs in the background mode.

The SR allocation may also include an associated periodicity between resource elements allocated to the UE for transmitting SRs. In some embodiments, the periodicity may be longer than SR-allocation periodicities of UEs of the network that are in an active mode.

At 312, the UE may transmit an SR to the eNB in the resource element of the assigned SR allocation if the UE has data to send to the eNB for one or more of the background applications. In some embodiments, when the UE exits the background mode, the UE may transmit another indicator to the eNB to indicate that the UE is no longer in the background mode.

Figure 4:
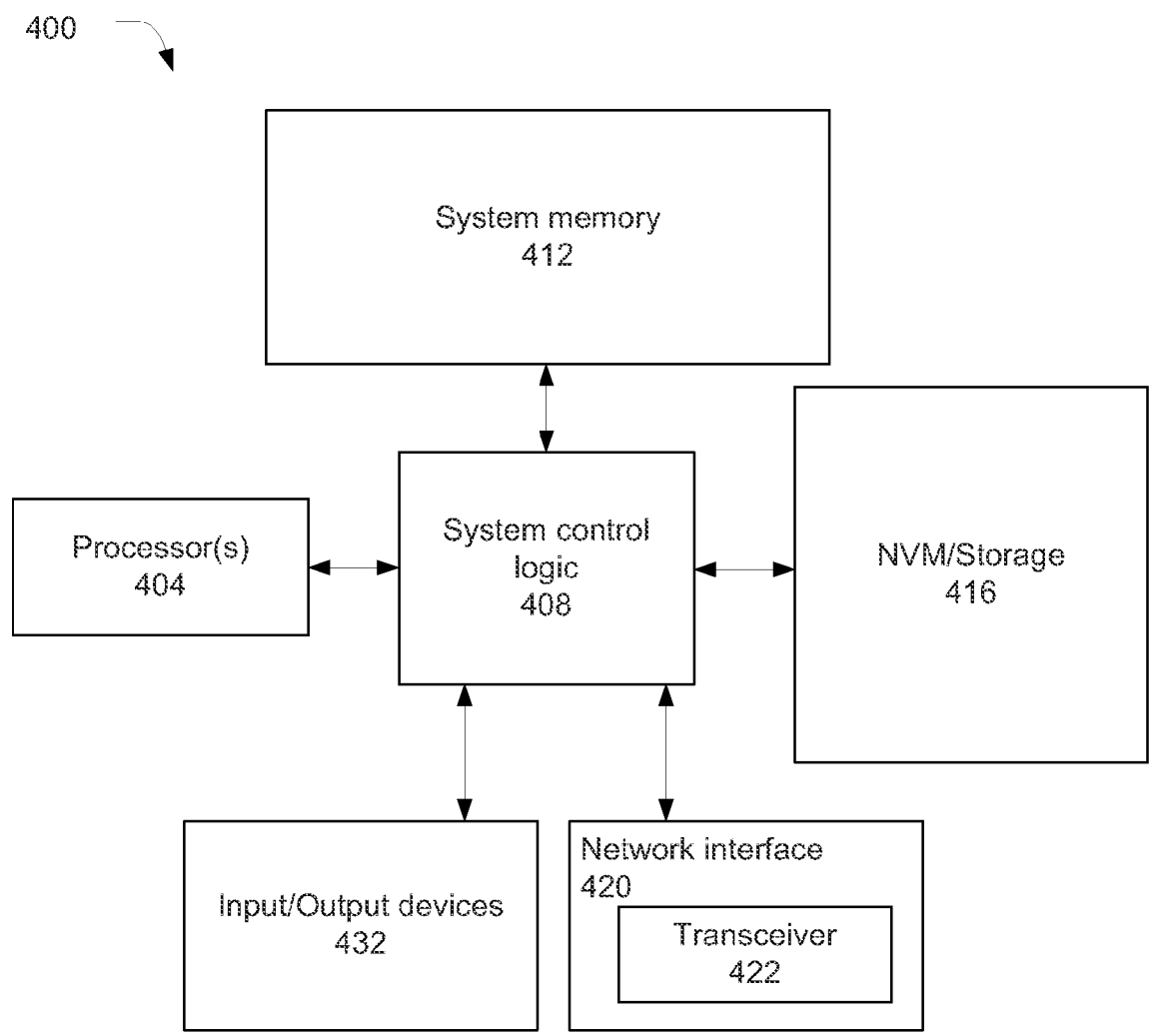
FIG. 4 is a block diagram illustrating an example computing system in accordance with various embodiments.

The eNB 104 and/or UE 108 described herein may be implemented into a system using any suitable hardware and/or software to configure as desired. FIG. 4 illustrates, for one embodiment, an example system 400 comprising one or more processor(s) 404, system control logic 408 coupled with at least one of the processor(s) 404, system memory 412 coupled with system control logic 408, non-volatile memory (NVM)/storage 416 coupled with system control logic 408, a network interface 420 coupled with system control logic 408, and input/output (I/O) devices 432 coupled with system control logic 408.

The processor(s) 404 may include one or more single-core or multi-core processors. The processor(s) 404 may include any combination of general-purpose processors and dedicated processors (e.g., graphics processors, application processors, baseband processors, etc.).

System control logic 408 for one embodiment may include any suitable interface controllers to provide for any suitable interface to at least one of the processor(s) 404 and/or to any suitable device or component in communication with system control logic 408.

System control logic 408 for one embodiment may include one or more memory controller(s) to provide an interface to system memory 412. System memory 412 may be used to load and store data and/or instructions, for example, for system 400. System memory 412 for one embodiment may include any suitable volatile memory, such as suitable dynamic random access memory (DRAM), for example.

NVM/storage 416 may include one or more tangible, non-transitory computer-readable media used to store data and/or instructions, for example. NVM/storage 416 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 416 may include a storage resource physically part of a device on which the system 400 is installed or it may be accessible by, but not necessarily a part of, the device. For example, the NVM/storage 416 may be accessed over a network via the network interface 420 and/or over Input/Output (I/O) devices 432.

Network interface 420 may have a transceiver 422 to provide a radio interface for system 400 to communicate over one or more network(s) and/or with any other suitable device. The transceiver 422 may implement communications module 120 of UE 108 or communications module 132 of eNB 104. In various embodiments, the transceiver 422 may be integrated with other components of system 400. For example, the transceiver 422 may include a processor of the processor(s) 404, memory of the system memory 412, and NVM/Storage of NVM/Storage 416. Network interface 420 may include any suitable hardware and/or firmware. Network interface 420 may include a plurality of antennas to provide a multiple input, multiple output radio interface. Network interface 420 for one embodiment may include, for example, a wired network adapter, a wireless network adapter, a telephone modem, and/or a wireless modem.

For one embodiment, at least one of the processor(s) 404 may be packaged together with logic for one or more controller(s) of system control logic 408. For one embodiment, at least one of the processor(s) 404 may be packaged together with logic for one or more controllers of system control logic 408 to form a System in Package (SiP). For one embodiment, at least one of the processor(s) 404 may be integrated on the same die with logic for one or more controller(s) of system control logic 408. For one embodiment, at least one of the processor(s) 404 may be integrated on the same die with logic for one or more controller(s) of system control logic 408 to form a System on Chip (SoC).

In various embodiments, the I/O devices 432 may include user interfaces designed to enable user interaction with the system 400, peripheral component interfaces designed to enable peripheral component interaction with the system 400, and/or sensors designed to determine environmental conditions and/or location information related to the system 400.

In various embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, a universal serial bus (USB) port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 420 to communicate with components of a positioning network, e.g., a global positioning system (GPS) satellite.

In various embodiments, the system 400 may be a mobile computing device such as, but not limited to, a laptop computing device, a tablet computing device, a netbook, a smartphone, etc. In various embodiments, system 400 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus comprising:
    communications circuitry configured to communicate with a plurality of user equipments (UEs) over a wireless communication network; and
    scheduling circuitry coupled with the communications circuitry and configured to:
        receive, from a first set of UEs of the plurality of UEs, an indicator that the first set of UEs are in a background mode in which individual UEs of the first set of UEs run one or more background applications and no active applications, wherein the one or more background applications do not interact with respective users of the individual UEs of the first set of UEs while the individual UEs are in the background mode; and
        assign a scheduling request (SR) allocation to the individual UEs of the first set of UEs based on the indicator that the first set of UEs are in the background mode, the SR allocations of the individual UEs including resource elements in a common resource block of a channel, wherein the common resource block is designated for SR allocations of UEs that are in the background mode.

2. The apparatus of claim 1, wherein the scheduling circuitry is further configured to notify the individual UEs of their respective SR allocations.

3. The apparatus of claim 2, wherein the scheduling circuitry is configured to notify the individual UEs of their respective SR allocations via a radio resource control (RRC) control message.

4. The apparatus of claim 1, wherein a periodicity of the assigned SR allocations for the UEs of the first set is longer than a periodicity for active mode UEs communicating with the communications circuitry over the wireless communication network, wherein the active mode UEs are engaged in active interaction with respective users of the active mode UEs.

5. The apparatus of claim 1, wherein the scheduling circuitry is further configured to instruct the individual UEs to use the assigned SR allocation instead of a random access channel to indicate that the individual UEs have data to send to the apparatus.

6. The apparatus of claim 1, wherein the first set includes up to eighteen UEs.

7. The apparatus of claim 1, wherein the channel is a physical uplink control channel (PUCCH).

8. The apparatus of claim 1, wherein the indicators are received via medium access control (MAC) messages.

9. The apparatus of claim 1, wherein the first set of UEs are in a radio resource control (RRC) connected state.

10. The apparatus of claim 1, wherein the scheduling circuitry is further configured to receive another indicator from one or more UEs to indicate that the one or more UEs are no longer in the background mode.

11. An apparatus to be employed by a user equipment (UE), the apparatus comprising:
    communications circuitry configured to communicate with an evolved Node B (eNB) over a wireless communication network; and
    applications circuitry coupled with the communications circuitry and configured to:
    transmit, to the eNB, an indicator that the UE is in a background mode in which the applications circuitry runs one or more background applications and no active applications, wherein the one or more background applications are run without active user interaction; and
    receive a message from the eNB to update a scheduling request (SR) allocation assigned to the UE, wherein a resource element of the assigned SR allocation for the apparatus is included in a resource block of a channel designated for SR allocations of UEs in the background mode.

12. The apparatus of claim 11, wherein the applications circuitry is further configured to transmit an SR indicator to the eNB in the resource element of the assigned SR allocation to indicate that the UE has data to send to the eNB for one or more of the background applications.

13. The apparatus of claim 11, wherein the assigned SR allocation includes an associated periodicity that is longer than SR-allocation periodicities of UEs of the wireless communication network that are in an active mode.

14. The apparatus of claim 11, wherein the applications circuitry is configured to exclusively use the assigned SR allocation for notifying the eNB that the UE has data to send to the eNB.

15. The apparatus of claim 11, wherein the indicator is transmitted via a medium access control (MAC) message.

16. The apparatus of claim 11, wherein the applications circuitry is further configured to transmit another indicator to the eNB to indicate that the UE is no longer in the background mode.

17. A method comprising:
receiving, by an evolved Node B (eNB) from a plurality of user equipments (UEs), an indicator that the plurality of UEs are in a background mode, wherein the plurality of UEs are not engaged in active interaction with respective users of the plurality of UEs during the background mode;
designating one or more resource blocks of a physical uplink control channel (PUCCH) for scheduling requests (SRs) from UEs that are in the background mode; and
assigning an SR allocation in the one or more designated resource blocks to individual UEs of the plurality of UEs based on the receiving the indicator.

18. The method of claim 17, wherein the SR allocation identifies a resource element of the one or more designated resource blocks and a periodicity for individual UEs to use for sending SR indicators to the eNB.

19. The method of claim 18, wherein the periodicity is longer than a periodicity for active mode UEs communicating with the eNB.

20. The method of claim 17, further comprising transmitting a radio resource control (RRC) message to the plurality of UEs to notify the individual UEs of their assigned SR allocations.

21. The method of claim 17, wherein the indicator is received via medium access control (MAC) signaling.

22. The method of claim 17, wherein the UEs in the background mode are running one or more background applications and no active applications.

23. One or more non-transitory computer-readable media having instructions, stored thereon, that, when executed, cause a user equipment (UE) to:
transmit, to an evolved Node B (eNB) over a wireless communication network, an indicator that the UE is in a background mode in which the UE runs one or more background applications and no active applications, wherein the one or more background applications do not interact with a user of the UE while the UE is in the background mode; and
receive a message from the eNB updating a scheduling request (SR) allocation assigned to the UE based on the indicator, wherein a resource element of the assigned SR allocation for the UE is included in a resource block of a physical uplink control channel (PUCCH) designated for SR allocations of UEs in the background mode;
wherein the UE is configured to use the assigned SR allocation instead of a random access channel to indicate to the eNB that the UE has data to send to the eNB.

24. The one or more computer-readable media of claim 23, wherein the instructions, when executed, further cause the UE to transmit an SR indicator to the eNB in the resource element of the assigned SR allocation if the apparatus has data to send to the eNB for one or more of the background applications.

25. The one or more computer-readable media of claim 23, wherein the assigned SR allocation includes an associated periodicity that is longer than SR-allocation periodicities of UEs of the wireless communication network that are in an active mode.

26. The one or more computer-readable media of claim 23, wherein the indicator is transmitted via a medium access control (MAC) message.

* * * * *